(12) United States Patent
Hoggarth et al.

(10) Patent No.: US 8,351,637 B2
(45) Date of Patent: Jan. 8, 2013

(54) FRAME EARHOOK

(75) Inventors: Marcus Hoggarth, St. Albans (GB);
Raun Forsyth, Beaconsfield (GB);
Stephen De Saulles, London (GB)

(73) Assignee: GN Netcom A/S, Ballerup (DK)

( * ) Notice: Subject to any disclaimer, the term of this patent is extended or adjusted under 35 U.S.C. 154(b) by 128 days.

(21) Appl. No.: 12/810,252

(22) PCT Filed: Nov. 20, 2008

(86) PCT No.: PCT/DK2008/000412
§ 371 (c)(1),
(2), (4) Date: Sep. 24, 2010

(87) PCT Pub. No.: WO2009/065408
PCT Pub. Date: May 28, 2009

(65) Prior Publication Data
US 2011/0002499 A1    Jan. 6, 2011

(30) Foreign Application Priority Data
Nov. 23, 2007    (DK) ................................ 2007 01669

(51) Int. Cl.
*H04R 25/00* (2006.01)

(52) U.S. Cl. ......... 381/381; 381/374; 381/379; 181/129

(58) Field of Classification Search .................. 381/374, 381/379, 381; D14/249; 181/129
See application file for complete search history.

(56) References Cited

U.S. PATENT DOCUMENTS

| 4,712,893 | A  | * | 12/1987 | Anger .......................... 351/123 |
| 4,972,468 | A  |   | 11/1990 | Murase et al. |
| 6,233,344 | B1 |   | 5/2001  | Clegg et al. |
| 2006/0067556 | A1 |   | 3/2006 | Bailey et al. |
| 2007/0049361 | A1 | * | 3/2007 | Coote et al. ................. 455/575.2 |

FOREIGN PATENT DOCUMENTS
WO    00/56118    9/2000

OTHER PUBLICATIONS

Written Opinion corresponding to International Patent Application No. PCT/DK2008/000412, European Patent Office, dated Feb. 6, 2009, 2 pages.
International Search Report corresponding to International Patent Application No. PCT/DK2008/000412, European Patent Office, dated Feb. 6, 2009, 5 pages.
Chinese Search Report corresponding to co-pending Chinese Patent Application Serial No. 200880125207.4, Patent Office of the People's Republic of China, dated Jul. 6, 2012; (2 pages).

* cited by examiner

*Primary Examiner* — Yuwen Pan
*Assistant Examiner* — Matthew Eason
(74) *Attorney, Agent, or Firm* — Nixon Peabody LLP

(57) ABSTRACT

An earhook (1), for example for a headset, to be worn around the root of the auricle (14) in the postauricular sulcus. The earhook (1) extends between a first end (5) and a second end (6) and has at least a first (2) and a second (3) curved element interconnected at the first end (5). Each curved element (2, 3) has a concave first side pointing forward towards the root of the auricle (14) and a convex second side pointing away from the root of the auricle (14) when worn. The curved elements (2, 3) are arranged with lateral distance (w) seen in a direction essentially perpendicular to the side of the head.

20 Claims, 5 Drawing Sheets

FRAME EARHOOK

CROSS-REFERENCE TO RELATED APPLICATIONS

This application is a U.S. National Stage of International Application No. PCT/DK2008/000412, filed Nov. 20, 2008, which claims the benefit of Danish Patent Application No. PA 2007 01669, filed on Nov. 23, 2007, both of which are incorporated herein by reference in their entireties.

TECHNICAL FIELD

The invention relates to an earhook, for example for a headset, to be worn around the root of the auricle in the postauricular sulcus, the earhook extending between a first end and a second end and having at least a first and a second curved element interconnected at the first end, wherein each curved element has a concave first side pointing towards the root of the auricle and a convex second side pointing away from the root of the auricle when worn.

BACKGROUND ART

Headsets and earphones can be secured to a user's head by different means. As examples, these means can be a headband, a neckband or an earhook. The present invention relates to an earhook. Sometimes synonyms, such as ear loop, ear hanger, or ear brace are used instead of earhook. An earhook is a curved or essentially C-shaped device, which is attached to a headset device, such as a headset housing, an earphone or the like. In order to mount the headset on the ear, the earhook is arranged around the auricle, such that it partly encircles the root of the auricle and extends in the so-called post auricular sulcus. The term "root of the auricle" refers to the area of the outer ear where it protrudes from the side of the head. Postauricular sulcus is the depression behind the ear next to the head. The "auricle" is the externally visible cartilaginous structure of the external ear. Synonyms for auricle are "pinna" or "outer ear".

There exist earhooks in various shapes and designs. The earhooks disclosed in e.g. U.S. Pat. Nos. 7,050,598 and 6,449,374 exert an inwards pressure on the root of the auricle to secure a better attachment.

WO 00/56118 discloses an earhook according to the preamble of claim 1. This earhook has an outer curved element and an inner curved element and means to adjust the distance between the elements in order to adjust the earhook to the ear of a specific user. This solution makes it possible to design an earhook, which is adjustable to different ears.

DISCLOSURE OF THE INVENTION

An object of the invention is to provide an earhook, which provides a proper attachment to the ear of the user. The earhook according to the invention is characterised in that the curved elements are arranged with lateral distance seen in a direction essentially perpendicular to the side of the head. Such an earhook provides a proper attachment to the ear as it abuts the side of the pinna facing the head and the side of the head without being bulky.

The first and the second elements may have essentially the same radii of curvature at the same distance from the first end.

The first and second elements may be interconnected at the second end.

According to an embodiment, the first curved element is resilient, so that the lateral distance between the first and second element can be varied. In this case, the distance between the curved elements can be reduced to adapt the earhook to the width of the post auricular sulcus. The resiliency of the first curved element can be chosen to press against the ear and the head with a force sufficient to hold the earhook on the ear.

A symmetric compression of the first and second curved elements can be obtained, if also the second curved element is resilient.

According to an alternative embodiment, the first and the second curved element are resiliently interconnected at one or both ends, so that the lateral distance between them can be varied.

Alternatively, the first and second curved elements are joined at one or both ends, e.g. by pivots, and interconnected by a spring, e.g. somewhere between the ends, so that the lateral distance between the first and second element can be varied.

According to a preferred embodiment, the earhook comprises a third curved element, which is having a convex side facing the concave sides of the first and the second element, so that it lies closer to the root of the auricle when worn, the third element being connected to the first and the second elements at the first end. This ensures a particular firm attachment to the ear as the third curved element abuts the root while the first and second elements abut the pinna and the side of the heads respectively at a distance from the root.

The third element may be connected to the first and second element at the second end.

According to an embodiment, the third element is resilient. This ensures a proper adaptation to the specific user's ear.

According to an embodiment, the third element is adjustably connected to the first and second elements at the first end or second end, so that the distance between the third element and the first and second elements can be varied. In this way, a further adaptation possibility is provided. If the third element is resilient, the curvature of it can be varied in order to adapt the earhook to a specific ear.

For example, the third element may have a pin at the second end that engages one of a number of holes along a member connecting the first and second member at the second end. Alternatively, the first and second member may be connected to a pin, which can engage one of a number of holes along the third element at the second end. However, the adjustment means can take many different forms. If the first and second curved elements are made of wire, they could be provided with corrugations to hold a pin protruding from the third element.

The third element may be resiliently connected to the first and second elements at the first end. In this case, the third element itself does not have to be resilient itself.

The third element can also be resiliently connected to the first and second elements at the second end.

According to a preferred embodiment, the first, second and third elements converge toward the first and/or second end. This ensures a smooth earhook, which is easy to mount on the ear.

According to an embodiment, only the first and second elements converge toward the first and/or second end.

In both cases, the earhook is widest at a position between the first and the second, and the maximum width is preferably between 6 and 14 mm, more preferably between 8 and 12 mm.

According to a preferred embodiment, the first and second elements are wire-like elements. These can be made of any materials, such as metal, plastic and rubber. For example, they could be mad of plastic or rubber coated wire. A rubber or silicone surface could be an advantage due to its friction, which prevents the curved elements from sliding across the skin of the ear and the side of the head. Wire-like elements provides possibility for obtaining better ventilation of the skin, a lighter construction and a discreet appearance.

According to a specific embodiment, the third element is made of rubber or silicone alone, as this would provide a particular soft and comfortable abutment against the root of the auricle.

The first and second elements and an interconnection at the second end can be obtained by simply bending a wire.

The earhook could also comprise a fourth curved element that extends essentially parallel with the third element. In this case, it would be advantageous, if the four curved elements together create an isosceles trapezoid shaped cross-section, where the shortest of the parallel sides faces the root of the ear. An isosceles trapezoid is a quadrilateral, where two opposite sides are parallel, the two other sides are of equal length, and the two ends of each parallel side have equal angles.

The first and second curved elements are essentially mirror symmetrical. This provides a more secure mounting, as reaction forces from the rear side of the ear and the side of the head are aligned without causing moment arms.

Preferably, the complete earhook is essentially symmetrical with respect to a plane lying between the first and the second curved elements. Such an earhook can be used on both left and right ear.

The first and second curved elements are preferably continuous. Thus, a smoother mounting can be obtained.

The invention also relates to a headset comprising an earhook as described above and a headset housing, wherein the headset housing is connected to the first end of the earhook.

The headset housing can bee hinged to the first end of the earhook. Preferably, the headset body and the first end of the earhook are interconnected so they can rotate about two different axes, preferably perpendicular axes, in relation to each other.

BRIEF DESCRIPTION OF THE DRAWINGS

The invention is explained in detail below with reference to the drawing illustrating a preferred embodiment of the invention and in which.

Figure 1:
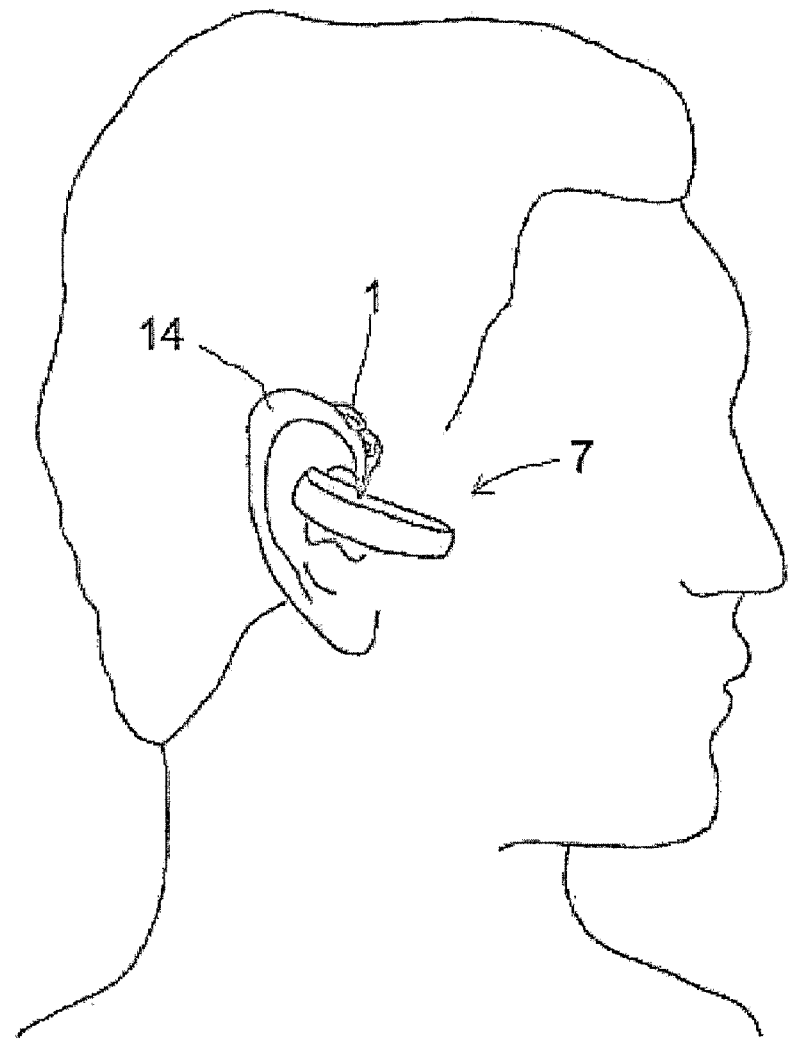
FIG. 1 is a side view of a user wearing a headset comprising an earhook according to the invention.

The following reference signs are used in the figures and the following detailed description of the preferred embodiment.

1 earhook
2 first curved element
3 second curved element
4 third curved element
5 first end of earhook
6 second end of earhook
7 headset
8 headset housing
9 earphone
10 microphone
11 pin
12 hole in headset housing
13 hinge
14 auricle
15 inner curved element
16 inner curved element
17 stud
18 engagement holes
19 stud
20 corrugations
21 engagement opening
22 connecting part
23 head
x first axis
y second axis
w lateral distance
h radial distance

MODES FOR CARRYING OUT THE INVENTION

FIG. 1 discloses a schematic side view of a user wearing a headset 7 comprising an earhook 1 according to the invention. As seen, the headset 7 is held with an earphone (reference number 9 in FIG. 2) at the entrance of the ear canal and the end with the microphone (10 in FIG. 2) pointing in the direction of the mouth. The headset 7 comprises an earhook 1, which is arranged around the auricle 14 so that it partly encircles the root of the auricle and extends in the so-called postauricular sulcus, which is the cavity between the auricle and the side of the head, behind the root of the auricle. The headset 7 is a wireless Bluetooth headset.

Figure 2:
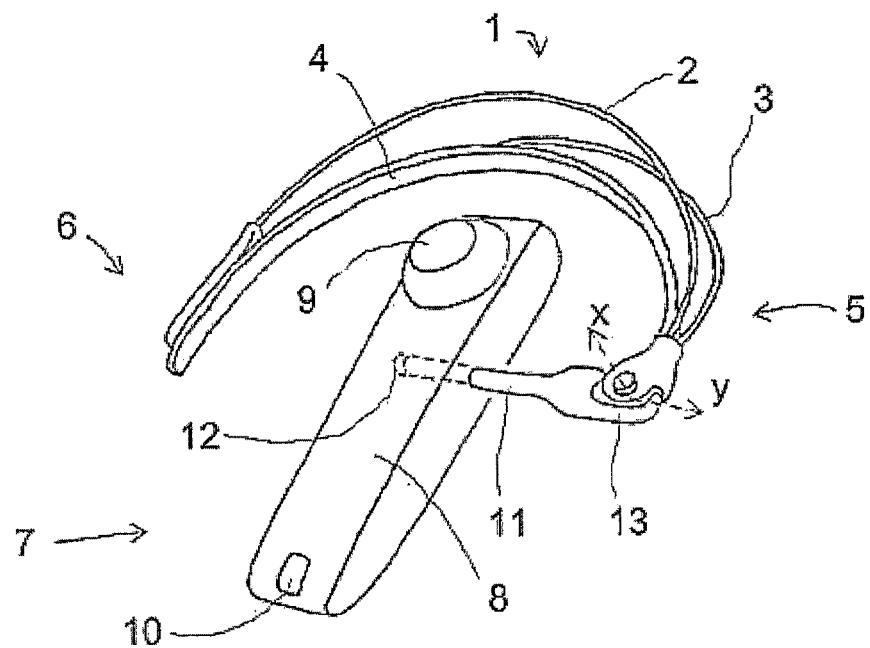
FIG. 2 is a perspective view of a preferred embodiment of a headset comprising an earhook according to a first embodiment of the invention.

FIG. 2 discloses the headset 7 in more detail. The headset comprises a headset housing 8 with an earphone 9 at a first end and a microphone 10 at the second end. An earhook 1 is attached to the headset housing 8 at a position between the earphone 9 and the microphone 10. The earhook 1 comprises a first end 5 and a second end 6. At the first end 5, a pin 11 is via a hinge 13 connected to the remainder of the earhook, so that it can rotate about a first axis x. The pin 11 is rotatably inserted in a transversal through-going hole 12 in the headset housing 8. As the pin 11 can rotate in the hole 12 about a second axis Y, the earhook 1 can rotate about two perpendicular axes X, Y in relation to the headset housing 8. As the pin 11 can be inserted from each of the ends of the through-going hole 12 and can rotate about the axis Y, the headset can be adapted for use on both left and right ear.

Three elements 2, 3, 4 extend between the first end 5 and the second end 6 of the earhook 1. These three elements 2, 3, 4 make up a curved, in general crescent-shaped part. The three elements are a first 2 and a second 3 outer curved element and a third inner curved element 4. The outer elements 2, 3 are wire-shaped flexible elements adapted to abut the side of the head and the innermost side of the auricle facing the head, respectively. Due to their flexibility, the outer elements 2, 3 can flex towards another, whereby the width of the earhook 1 can adapt itself to the width of the post auricular sulcus of the user. When fitted the outer elements 2, 3 will press slightly against the side of the head and the side of the auricle facing the head. The inner curved element 4 is band-shaped and lies in the narrow bottom of the post auricular sulcus. Together with the two outer curved elements 2, 3 it provides a stable and reliable mounting of the earhook. The inner element 4 may be provided with some kind of cushioning material, such as rubber or silicone on the concave side to make the earhook more comfortable to wear.

Figure 3:
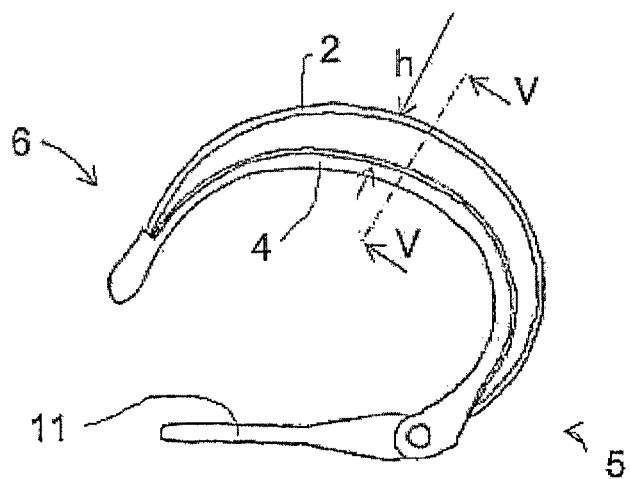
FIG. 3 is a side view of the earhook according to the first embodiment.

FIG. 3 discloses the earhook 1 alone and from the side. It is not clear from the drawing but the two outer elements 2, 3 are not fixed to the inner element 4 at the second end 6 in the longitudinal direction. Thereby, the distance h between the third element 4 and the two outer elements 2, 3 can be varied. This enhances the flexibility and adaptability.

Figure 4:
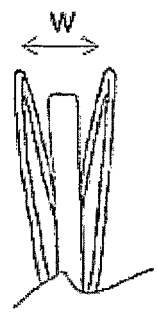
FIG. 4 is an end view of the earhook according to the first embodiment.

FIG. 4 discloses and end view of the earhook 1. The lateral distance w between the two outer elements 2, 3 can be reduced by flexing them towards each other.

Figure 5:
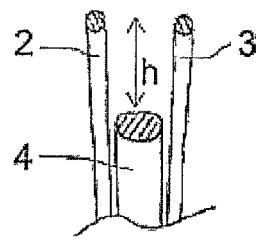
FIG. 5 is a cross sectional view taken along the line V-V in FIG. 3.

FIG. 5, which is a cross sectional view taken along the line V-V in FIG. 3, discloses the cross sectional shape of the three elements 2, 3, 4. The reference letter h refers to the radial distance between the inner element 4 and the two outer elements 2, 3.

Figure 6:
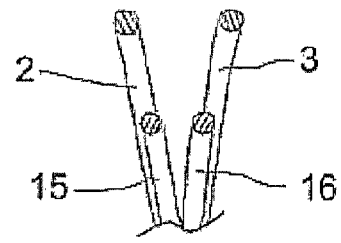
FIG. 6 is a cross sectional view through a second embodiment of the earhook.

FIG. 6 is a cross sectional view through a second embodiment, where the inner third element is replaced by two inner curved elements 15, 16. The four curved elements 2, 3, 15, 16 together create an isosceles trapezoid shaped cross-section, where the shortest of the parallel sides faces the root of the auricle. The inner elements 15, 16 are also wire-like and flexible, whereby an even further flexible and adaptive earhook is obtained.

Figure 7:
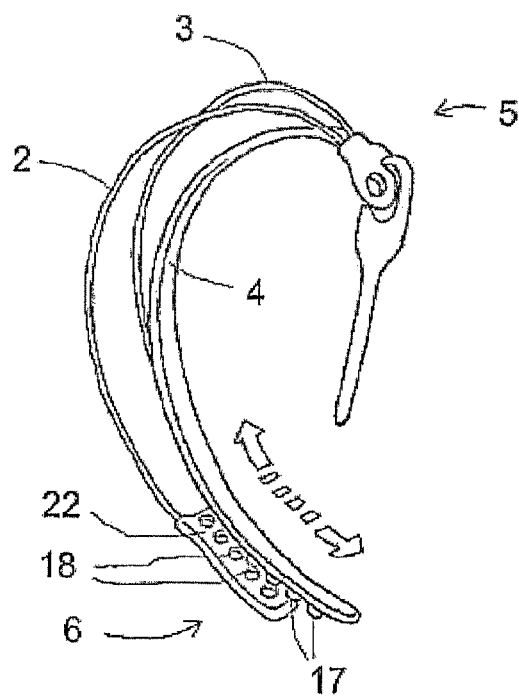
FIG. 7 is a perspective view of an earhook according to a third embodiment.

FIG. 7 discloses a third embodiment of the earhook according to the invention. At the second end 6, the two outer curved elements 2, 3 are interconnected by a connecting part 22. This connecting part 22 is provided with a number of engagement holes 18, which can be engaged by a number of corresponding studs 17 on the inner curved element 4. By interlocking the inner element 4 with the outer elements 2, 3 at different positions, the radial distance h between the inner 4 and the outer 2, 3 can be varied in a simple and reliable manner. If the third element 4 is made of sufficient resilient material, also the curvature of the inner element 4 depends on the position, at which the inner element 4 is interlocked with the outer elements 2, 3. In this way, it is easier to adapt the earhook 1 to a specific ear size.

Figure 8:
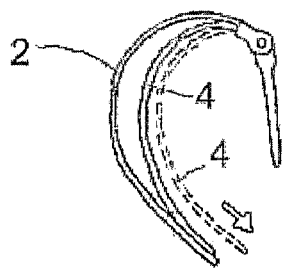
FIG. 8 is a schematic side view of the third embodiment of the earhook.

FIG. 8 schematically discloses how the radial distance h between the inner 4 and the outer elements 2, 3 is varied when they are mutually interlocked in different positions.

Figure 9:
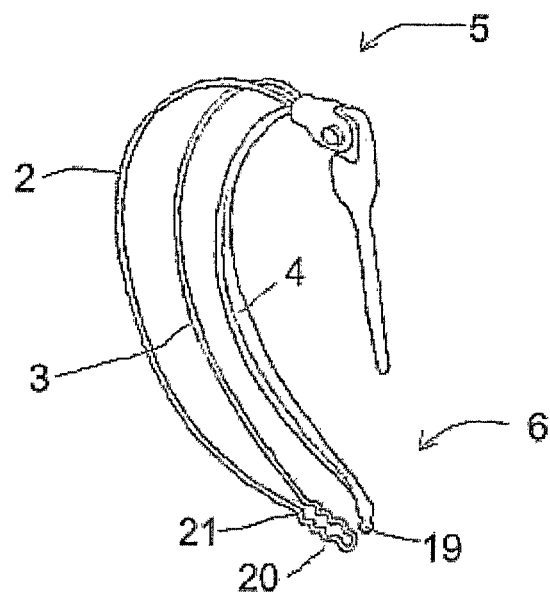
FIG. 9 is a perspective view of a fourth embodiment of the earhook.

FIG. 9 discloses a fourth embodiment of an earhook 1 according to the invention. The two outer elements 2, 3 are made of a single piece of wire, which is bent almost 180° at the second end 6. At the second end 6, the wire is also provided with corrugations 20 that create engagement openings 21. A stud 19 on the end of the third element 4 can engage one of the engagement openings 21 and interlock the inner 4 and the outer elements 2, 3 in different positions in order to adapt the earhook to different users.

Figure 10:
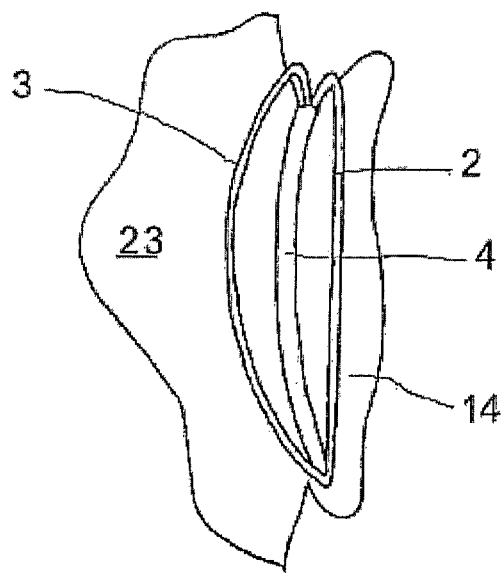
FIG. 10 is a perspective rear view of an earhook according to the first embodiment worn on the ear of a user.

FIG. 10 discloses how the earhook, when worn, is situated in the postauricular sulcus, which is the furrow between the auricle and the side of the head behind the root of the auricle. The inner curved element 4 is arranged closest to the root of the auricle while the two outer curved elements 2, 3 are lying at a distance from the root of the auricle. In FIG. 10, the user wears the headset on his right ear 14. The first outer curved element 2 abuts the auricle 14 and the second outer curved element 3 abuts the side of the head 23.

Figure 11:
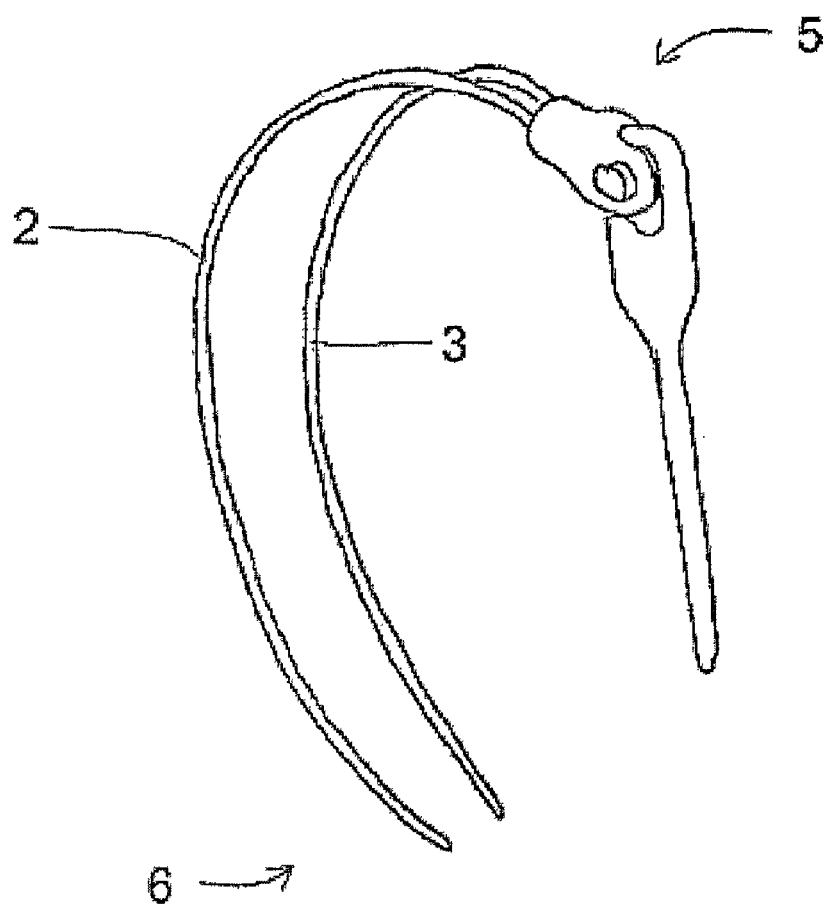
FIG. 11 is a perspective view of an earhook according to a fifth embodiment.

FIG. 11 discloses a fifth embodiment of an earhook, which comprises only two elements 2, 3 arranged with lateral distance seen in a direction essentially perpendicular to the side of the head. Thus, there are no "inner" elements. The two elements 2, 3 are only interconnected at the first end 5. This embodiment is particular simple and light.

When a user wants to mount a headset with an earhook according to the invention, he simply pulls it down behind the ear root until the two outer curved and flexible elements exert a gentle pressure on the auricle and the side of the head, respectively. If he uses one of the embodiments shown in FIGS. 7 and 9 he can try out the earhook with the inner 4 and outer 2, 3 elements in different interlocking positions until he finds the best suitable and most comfortable. By making the earhook as a wire frame construction, several advantages can be obtained, such as better ventilation of the skin, a lighter construction and a discreet appearance.

Different materials can be used for the earhook. Preferably, the outer elements 2, 3 are made of metal, e.g. stainless steel or spring steel. In addition, the inner element(s) can be made of metal. The metal can be covered with rubber or silicone whereby friction between the elements and the skin is enhanced.

According to an embodiment, the inner element is made of silicon or rubber only whereby a high degree of comfort can be combined with a stable mounting on the ear.

The curved elements of the shown embodiments are flexible due to their shape and the choice of material. However, flexibility could also be obtained by using flexible interconnections between the elements. In this case, the elements could be completely rigid.

The elements do not necessary have to be able to flex. The elements could be completely rigid and have rigid interconnections.

The invention claimed is:

1. An earhook to be worn around the root of the auricle in the postauricular sulcus, the earhook extending between a first end and a second end and having at least a first and a second curved element interconnected at the first end wherein each curved element has a concave first side pointing towards the root of the auricle and a convex second side pointing away from the root of the auricle when worn, wherein the curved elements are arranged with lateral distance seen in a direction essentially perpendicular to the side of the head, the earhook further comprising a third curved element having a convex side facing the concave sides of the first and the second element, so that it lies closer to the root of the auricle when worn, the third element being connected to the first and the second elements at the first end.

2. An earhook according to claim 1, wherein the first and second elements are interconnected at the second end.

3. An earhook according to claim 1, wherein the first curved element is resilient, so that the lateral distance between the first and second element can be varied.

4. An earhook according to claim 3, wherein the second curved element is resilient.

5. An earhook according to claim 1, wherein the first and the second curved element are resiliently interconnected at one or both ends, so that the lateral distance between them can be varied.

6. An earhook according to claim 1, wherein the first and second
   curved elements are joined at one or both ends and interconnected by a spring, so that the lateral distance between the first and second element can be varied.

7. An earhook according to claim 1, wherein the third element is connected to the first and second element at the second end.

8. An earhook according to claim 1, wherein the third element is resilient.

9. An earhook according to claim 1, wherein the third element is adjustably connected to the first and second elements at the first end or second end, so that the distance between the third element and the first and second elements can be varied.

10. An earhook according to claim 1, wherein the third element is resiliently connected to the first and second elements at the first end.

11. An earhook according to claim 7, wherein the third element is resiliently connected to the first and second elements at the second end.

12. An earhook according to claim 1, wherein the first, second and third elements converge toward the first and/or second end.

13. An earhook according to claim 1, wherein the first and second elements converge toward the first and/or second end.

14. An earhook according to claim 1, wherein the first and second elements are wire-like elements.

15. An earhook according to claim 1, wherein the first and second curved elements are essentially mirror symmetrical.

16. An earhook according to claim 15, wherein the earhook is essentially symmetrical with respect to a plane lying between the first and the second curved elements.

17. An earhook according to claim 1, wherein the first and second are continuous.

18. A headset comprising an earhook according to claim 1, and a headset housing, wherein the headset housing is connected to the first end of the earhook.

19. An earhook to be worn around the root of the auricle in the postauricular sulcus, the earhook extending between a first end and a second end and having at least a first and a second curved element interconnected at the first end,
    wherein each curved element has a concave first side pointing towards the root of the auricle and a convex second side pointing away from the root of the auricle when worn,
    wherein the curved elements are arranged with lateral distance seen in a direction essentially perpendicular to the side of the head,
    wherein the curved elements are both worn around the root of the auricle in the postauricular sulcus in a spaced apart relationship defined by the lateral distance, and
    wherein the first and second curved elements are essentially mirror symmetrical with respect to a plane lying between the first and the second curved elements when worn around the root of the auricle in the postauricular sulcus.

20. The earhook according to claim 19, further comprising a third curved element having a convex side facing the concave sides of the first and the second element, the third element being connected to the first and the second elements at the first end.

* * * * *